United States Patent [19]

Roest et al.

[11] 3,925,512

[45] Dec. 9, 1975

[54] PROCESS FOR THE PREPARATION OF BLOCK COPOLYMERS CONTAINING α-METHYLSTYRENE

[75] Inventors: Bernard C. Roest, Geleen; Herman A. J. Schepers, Stein, both of Netherlands

[73] Assignee: Stamicarbon, N.V., Geleen, Netherlands

[22] Filed: Apr. 7, 1972

[21] Appl. No.: 242,234

[30] Foreign Application Priority Data
Apr. 14, 1971 Netherlands .................... 7104949

[52] U.S. Cl. ............................ 260/880 B; 260/886
[51] Int. Cl.$^2$. C08L 9/06; C08L 25/10; C08L 25/16
[58] Field of Search ......................... 260/880 B, 886

[56] References Cited
UNITED STATES PATENTS

| | | | |
|---|---|---|---|
| 3,070,574 | 12/1962 | Kasting et al. | 260/93.5 S |
| 3,251,905 | 5/1966 | Zelinski | 260/880 B |
| 3,346,666 | 10/1967 | Dennis | 260/880 B |
| 3,665,052 | 5/1972 | Saam | 260/886 |

FOREIGN PATENTS OR APPLICATIONS
1,191,605  5/1970  United Kingdom ............ 260/880 B

*Primary Examiner*—Joseph L. Schofer
*Assistant Examiner*—Maria S. Tungol
*Attorney, Agent, or Firm*—Cushman, Darby & Cushman

[57] ABSTRACT

A process for preparing block copolymers is disclosed, wherein a living polymer of a diene is formed which carries at least one negatively charged diene unit in the end position, from 1 to 100 monomer units of styrene or a ring-substituted styrene derivative is polymerized on each living polymer anion site, and then a polymer block of α-methylstyrene units is formed by polymerization of α-methylstyrene. The cross-over reaction from the polymer block having the dienyl anion in the end position to the α-methylstyrene is facilitated by the presence of the styrene or styrene derivative.

The block copolymers can be employed for numerous applications wherein synthetic rubber is used, such as in bicycle tires, footwear, flooring, adhesives, coatings and elastomeric fibers.

13 Claims, No Drawings

PROCESS FOR THE PREPARATION OF BLOCK COPOLYMERS CONTAINING α-METHYLSTYRENE

BACKGROUND OF THE INVENTION

The preparation of block copolymers by use of the "living polymer" principle is known to the art, see e.g. British Patent No. 852,823. According to this patent, a block copolymer is prepared by polymerization with an anionic initiator of a first monomer to a polymer which carries one or more negative charges in the end position, depending upon the functionality of the initiator. This forms the so-called living polymer. If a second monomer is added to the living polymer, without previous deactivation of the living polymer, the polymerization of a second monomer is initiated by the living polymer to produce a block copolymer having blocks of the first monomer and blocks of the second monomer. The block copolymer so obtained can be deactivated and recovered from solution, or, alternatively, may, in its turn, also be employed for polymerizing yet another monomer.

A special class of block copolymers which has been prepared by the art by the living polymer principle is that group of block copolymers having the formula A-B-C, wherein A and C are nonelastomeric blocks and B is an elastomeric polymer block. Even in their uncured condition, the A-B-C block copolymers possess elastomeric properties which are comparable to the properties of conventional cured rubbers. These A-B-C block copolymers are normally produced from styrene and conjugated diene, such as isoprene or butadiene. In spite of their useful properties, the polystyrene-polydiene-polystyrene block copolymers have a significant drawback in that the elastomeric properties are rapidly lost at elevated temperatures.

The prior art has also produced block copolymers which can be employed at elevated temperatures without loss of elastomeric properties, note, e.g. British Patent Nos. 1,189,767 and 1,191,605. These block copolymers are produced by replacing the styrene blocks A and/or C by α-methylstyrene blocks. For instance, the aforesaid patent describes a block copolymerization to produce a polystyrene-polyisoprene-poly (α-methyl-styrene) block copolymer, by polymerizing styrene with a monofunctional anionic initiator to the living polystyrene, then polymerizing isoprene on the living polystyrene to form a polystyrene-polyisoprene block copolymer whose isoprene unit in end position carries a negative charge, and then polymerizing α-methylstyrene on the polystyrene-polyisoprene block to form the desired block copolymer. This patent also describes a block copolymer of poly (α-methylstyrene)-polyisoprene-poly(α-methylstyrene) which can be prepared by polymerizing isoprene with a bifunctional anionic initiator to produce living polyisoprene whose two isoprene units in the end position each carry a negative charge, and then polymerizing α-methylstyrene on the living polyisoprene to produce the poly (α-methylstyrene)-polyisoprene-poly (α-methylstyrene) block copolymer. An alternative method of making this latter block copolymer is by polymerizing α-methyl styrene with a monofunctional anionic initiator to the living poly (α-methylstyrene), then polymerizing isoprene with the formation of a living poly (α-methylstyrene)-polyisoprene block copolymer whose isoprene unit in the end position carries a negative charge, and then polymerizing α-methylstyrene on the living block copolymer.

A drawback of the prior art processes mentioned above is that the formation of the block copolymers containing α-methylstyrene takes considerable time, mainly because of the very sluggish and often far from complete cross-over reaction from a polymer block containing at least one dienyl anion to the α-methylstyrene. As a result, the prior art block copolymers which have been produced have α-methylstyrene polymer blocks which vary widely in molecular weight, and as a result, the properties of elastomeric polymer are far from optimum.

SUMMARY OF THE INVENTION

The present invention is directed to an improvement in a process for preparing block copolymers of the general formulae B-C and A-B-C, wherein A is a non-elastomeric polymer block, B is an elastomeric polymer block of at least one conjugated diene and C is a polymer block of α-methylstyrene, by preparing a living polymer carrying at least one negatively charged diene unit in the end position and thereafter polymerizing α-methylstyrene on the living polymer to form an α-methylstyrene polymer block. The improvement involves polymerizing from 1 to 100 monomer units of styrene or a ring-substituted styrene derivative on the living polymer prior to polymerization of the α-methylstyrene polymer block. The presence of the styrene or styrene derivative anion in the end position facilitates the cross-over reaction to the α-methylstyrene. The invention also includes the novel copolymers produced by the present process.

DESCRIPTION OF THE INVENTION

The present invention provides a process for producing elastomeric block copolymers with a considerable reduction in the reaction time. The resulting block copolymers have a much narrower spread in molecular weight than the block copolymers produced by the prior art processes. The block copolymers of the present invention have excellent mechanical properties and good processability.

Block copolymers having the general formula B-C or A-B-C, wherein A is a nonelastomeric polymer block e.g. a polymer block of α-methylstyrene, B is an elastomeric polymer block of a conjugated diene, as more fully described hereinafter, and C is a polymer block of α-methylstyrene, are prepared by polymerization of a diene with an anionic initiator to produce a living polymer carrying at least one negatively charged diene unit in the end position, polymerizing from 1 to 100 monomer units of styrene or a ring-substituted styrene derivative, as more fully described hereinafter, on the living polymer per dienyl anion in the end position, and then polymerizing α-methylstyrene on the resulting polymer to produce the desired block copolymer product.

It has now been found that the cross-over reaction from the polymer block having at least one diene anion in the end position to the α-methylstyrene proceeds much faster in the presence of polymerized styrene or ring-substituted styrene derivatives. It is believed that first, a cross-over reaction takes place from the polymer block having at least one diene anion in the end position to the styrene or styrene derivative, with formation of a polymer carrying at least one styrene compound in the end position, which, in turn, provides a facile cross-over reaction to the α-methylstyrene. The block copolymers produced by the above-described process can be more accurately represented by the formulae $(B-X-C)_n$ or A-B-X-C, wherein A denotes a nonelastomeric polymer block having a number average molecular weight of 200 to 100,000 of at least one monoalkenyl aromatic compound, X represents from 1 to about 100 polymerized monomer units, bound to the diene polymer block, of at least 1 styrene compound of the formula

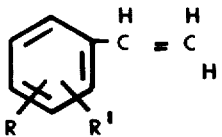

wherein R and R' are independently selected from the group consisting of hydrogen, halogen and lower alkyl, B represents an elastomeric polymer block having a number average molecular weight between 10,000 and 250,000 of at least one conjugated diene having 4 to about 12 carbon atoms, C represents a polymer of α-methylstyrene having a number average molecular weight of 200 to 100,000, $n'$ is a number of 1 to 8.

The styrene or ring-substituted styrene derivative contains a vinyl group which is not sterically hindered. The styrene compound should have an unsubstituted vinyl group thereon, but a wide variety of non-interfering substituents may be on the styrene ring. Preferably, the styrene compound is of the formula

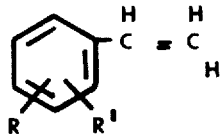

wherein R and R' are independently selected from the group consisting of hydrogen, halogen and lower alkyl (i.e. of 1 to 6 carbon atoms). Examples of particularly preferred compounds of the above formula include styrene, m-methylstyrene, p-methylstyrene, n- and p-ethylstyrene, 3,4-dimethylstyrene, 3,5-diethylstyrene, 3,5-dichlorostyrene, 3-chlorostyrene, 4-chlorostyrene and the like.

The styrene compound described above is broadly used in an amount of between 1 and 100 monomer units per dienyl anion in the end position. In other words, the final block copolymer product will contain between 1 and 100 monomer units aiding the crossover reaction, per α-methylstyrene block in the block copolymer. Preferably, the number of styrene compound monomer units is between 2 and 50, more preferably between 4 and 25, per dienyl anion in the end position.

The elastomeric polymer block B may be formed from any conjugated diene but it is particularly preferred to use conjugated dienes having 4 to about 12 carbon atoms. Examples of suitable conjugated dienes are: isoprene, 1,3-butatiene, 2,3-dimethyl-1,3-butadiene, 2-methyl-1,3-pentadiene, 2,3-dimethyl-1,3-pentadiene, 2-methyl-3-ethyl-1,3-pentadiene, 2-phenylbutadiene-1,3, and the like. The most preferred conjugated dienes are 1,3-butadiene and isoprene. Mixtures of conjugated dienes may be used, as well as mixtures of conjugated dienes with monovinyl aromatic compounds, such as styrene or the styrene derivatives described above. The number average molecular weight of the elastomeric block B may vary within wide limits. It is preferred, however, that the number average molecular weight of the elastomeric block B be between 10,000 and 250,000, more preferably between 15,000 and 150,000. It is even more preferred that the number average molecular weight of the elastomeric block B be greater than 25,000. Polymer block C is formed of α-methylstyrene units or a mixture of α-methyl styrene with other monoalkenyl aromatic compounds, such as styrene or styrene derivatives used in the formation of the linking block X. Preferably, polymer block C contains no more than 20 % by weight, more preferably less than 5 % by weight, of other monoalkenyl aromatic compounds. The other monoalkenyl aromatic compounds may be, for instance, styrene or the styrene derivatives described hereinbefore. The number average molecular weight of the polymer block C is preferably between 200 and 100,000, more preferably between 500 and 50,000.

The nonelastomeric polymer block A is an optional block in the block copolymers of the present invention and may be formed from any monomer or monomer mixture which, after polymerization, produces a nonelastomeric polymer block having a glass transition point above 25°C. Preferably, the nonelastomeric polymer block A is formed from one or more monoalkenyl aromatic compound of 8 to 12 carbon atoms, such as styrene, α-methyl-styrene, the styrene derivatives described hereinabove, and the like. The number average molecular weight of polymer block A will normally be between 200 and 100,000, more preferably between 500 and 50,000.

Polymer blocks A, B and C may be polymer blocks having several segments of different monomers, or such polymer blocks may be formed by copolymerization of a plurality of monomers.

The styrene compound may be introduced into the reaction chamber either before or after the polymerization of the conjugated diene. The styrene compound may also be introduced into the reaction chamber together with the α-methylstyrene. In that case, it is preferred that the temperature for the polymerization of the α-methylstyrene is not reduced until after the mixture of styrene compound and the α-methylstyrene has been added. In the process of the present invention, it is possible to introduce all of the monomers, e.g., the conjugated diene, the styrene compound and the α-methylstyrene, to the reaction chamber at the same time. In that case, the block polymer product will be a block copolymer having 5 polymer blocks, i.e., 2 α-methylstyrene polymer blocks, 2 polymer blocks of the styrene compound and 1 polymer block of the conjugated diene, if a bifunctional anionic initiation is used. If a monofunctional anionic initiator is used for the polymerization, the resulting product will be a block copolymer made of, in order, polymer blocks of the conjugated diene, the styrene compound, and the α-methylstyrene.

The process of the present invention may be conducted with any anionic polymerization initiator. However, compounds containing 1 or more alkali metals or alkaline earth metals are preferred. It is most preferred that the anionic initiator be an organolithium compound, as the use of such organolithium compounds allows the production of polymers having a relatively high cis-1,4 content in the polymerization of the conjugated dienes. Particularly preferred are those organolithium compounds in which the lithium atom is bound to a secondary carbon atom, as such initiators have short reduction times.

The process of the present invention can be conducted with monofunctional anionic initiators or polyfunctional anionic initiators. The monofunctional anionic initiators are preferably alkanes or alkenes, either straight chained or branched, having from 1 to 20 carbon atoms, wherein a single hydrogen atom has been replaced by a lithium atom. More preferably, the lithium atom has been substituted for a hydrogen atom on a secondary carbon atom. Examples of a suitable monofunctional anionic initiator include methyl lithium, ethyl lithium, butyl lithium, butenyl lithium, pentyl lithium, hexyl lithium, 2-ethyl hexyl lithium and n-dodecyl lithium. The most preferred monofunctional anionic initiatory is secondary butyl lithium.

The polyfunctional anionic initiators are preferably alkanes or alkenes having from 1 to 20 carbon atoms, including cycloalkanes and cycloalkenes, wherein 2 or more hydrogen atoms have been substituted by lithium atoms. In addition, aryl and alkaryl compounds containing 6 to 24 carbon atoms, wherein 2 or more hydrogen atoms have been substituted by lithium atoms may also be used. Examples of suitable polyfunctional anionic initiators include dilithium compounds such as dilithium ethane, 1,4-dilithium butane, 1,10-dilithium decane and 1,4-dilithium butene, trilithium compounds like 1,3,5-trilithium cyclohexane, 1,3,5-trilithium pentene, 1,5-15-trilithium eicosane, as well as polyfunctional aromatic anionic initiators such as 1,2,5-trilithium naphthalene and 1,2,3,5-tetralithium-4-hexyl anthracene. Obviously, the lithium atoms in these compounds can be replaced by one or more other alkali or alkaline earth metal atoms, such as potassium, sodium, calcium and barium.

The polymerization of the α-methylstyrene in the process of the present invention should preferably be conducted at a temperature below 15°C, as above that temperature the polymerization proceeds only at a rather slow rate. The preferred polymerization temperatures used in the preparation of polymer blocks from α-methylstyrene are 0° to -100°C. The polymerization of polymer blocks other than those of α-methylstyrene is normally conducted at higher temperatures, preferably at a temperature of between 20° and 100°C. It is preferred to conduct the polymerization of the elastomeric polymer blocks in the process of the present invention in the absence of polar compounds as the presence of polar compounds decidedly lower the cis-1,4 content of the elastomeric polymer block.

The use of quite low temperatures during the α-methyl styrene polymerization requires great care in the selection of the polymerization solvent. It is preferred to use a solvent or a mixture of solvents which remain liquid during all steps of the block copolymerization process of the present invention. Suitable solvents are hydrocarbons which do not release protons under the polymerization conditions, such as alkanes and cycloalkenes of 4 to 18 carbon atoms, e.g. hexane, heptane, pentane pentamethyl heptane, cyclohexane, benzene and toluene.

Preferably, polymerization accelerators are added to the solvents at some stage of the polymerization reaction. In the case of polar polymerization accelerators, it is strongly recommended that same be added to the polymerization system after the formation of the conjugated diene polymer block. Preferred polymerization accelerators are polar compounds such as dimethyl ethane, tetrahydrofuran, diethylene glycol dimethylether, hexamethyl phosphortriamide, tributylamine and bis-(2-ethoxyethyl) ether, although non-polar compounds, such as dioxane, may also be used.

If a monofunctional anionic initiator is used to prepare the block copolymers of the process of the present invention, an elastomeric polymer block carrying a dienyl anion in the end position will be first formed. This polymer block may be a homopolymer or copolymer of one or more conjugated diene, preferably of 4 to 12 carbon atoms in length, or this polymer block may be a block copolymer consisting of a nonelastomeric polymer block and a polymer block of a conjugated diene. Thereafter, from 1 to 100 monomer units of the above-described styrene compound are polymerized to form a polymer block carrying an anion of the styrene compound at one end. Thereafter the polymerization is continued with α-methylstyrene.

If a bifunctional or polyfunctional initiator is employed, the elastomeric polymer block of the conjugated diene is first formed. Depending upon the functionality of the initiator, this elastomeric polymer block carries two or more dienyl anions. Then, from 1 to 100 monomer units of the above-described styrene compound are polymerized on each dienyl anion in the end position, yielding a polymer carrying two or more anions of the styrene compound in the end position. Finally, α-methylstyrene is polymerized on the styrene compound anions to form α-methyl styrene polymer blocks.

The block copolymers produced according to the present invention can be employed for numerous uses, including those wherein synthetic rubber is normally used. Suitable uses include the production of bicycle tires, footwear, flooring, domestic articles and as a compouenent the adhesives and coatings. The block copolymers may be further processed to form elastomeric fibers using conventional methods.

EXAMPLES OF THE INVENTION

The invention will be understood more readily by reference to the following examples; however, these examples are intended to illustrate the invention and are not to be construed to limit the scope of the invention.

In the following examples, tensile strengths and rigidity (S 300 %) were determined according to ASTM ISO R 37 type 2, permanent set was determined according to ASTM D-412-68 and melt index was determined according to ASTM-D-1238.

COMPARATIVE EXAMPLES A – H

A series of comparative experiments were performed to demonstrate the prior art production of block copolymers. 50 ml of pentamethylheptane solvent, 4.47 g of α-methylstyrene and 3.40 g of isoprene were, in turn, added under nitrogen to a glass reaction vessel which was provided with a stirrer, a thermometer, and a cooling jacket. The reaction vessel contents were heated to a temperature of 50°C with simultaneous stirring, under a nitrogen atmosphere, whereupon the polymerization was initiated by the addition of 0.57 mmole of secondary butyl lithium. After about 45 minutes, the initially colorless reaction mixture assumed a deep red color, due to the formation of α-methylstyryl anions.

The reaction vessel contents were cooled to −40°C and the amount of tetrahydrofuran (THF) set forth in Table 1 below was added, whereupon the polymerization was continued for 1 hour. The polymerization was stopped by the addition of 10 ml of methanol containing 5 mg of dissolved 2,2'-methylene-bis(4-methyl-6-tert. butyl phenol), an antioxidant available under the trade name Plastonox 2246. The results of these comparative experiments are set forth in Table 1 below.

TABLE 1

| Comparative example | Amount of THF ml | Yield of block copolymer g | α-methylstyrene content of the block copolymer g | α-methylstyrene conversion % |
|---|---|---|---|---|
| A | 0 | 3.56 | 0.16 | 3.6 |
| B | 3 | 4.30 | 0.90 | 20.2 |
|   | 6 | 4.37 | 0.97 | 21.7 |
| C |   |   |   |   |
| D | 10 | 4.77 | 1.37 | 30.7 |
| E | 15 | 4.70 | 1.30 | 29.2 |
| F | 25 | 5.03 | 1.63 | 36.5 |
| G | 40 | 5.07 | 1.67 | 37.4 |
| H | 50 | 5.70 | 2.30 | 51.6 |

From the above comparative examples, it is clear that the conversion of α-methylstyrene can be increased by the addition of a polar polymerization accelerator, like THF, to the reaction mixture; however, the conversion of the α-methylstyrene remains low even with the addition of a large amount of the polymerization accelerator.

EXAMPLES 1 – 8

Comparative Example A was repeated, except that 0.9 g of styrene were introduced into the glass reaction vessel (that is, before heating the glass reaction vessel contained 50 ml of pentamethylheptane solvent, 4.47 g of α-methylstyrene, 3.40 g of isoprene and 0.9 g of styrene.) The results of these experiments are listed in Table 2 below.

TABLE 2

| Example | Amount of THF ml | Yield of block copolymer g | α-methylstyrene content of the block copolymer g | α-methylstyrene conversion % |
|---|---|---|---|---|
| 1 | 0 | 4.58 | 0.28 | 6.2 |
| 2 | 1 | 4.86 | 0.56 | 12.5 |
| 3 | 3 | 5.39 | 1.09 | 24.4 |
| 4 | 6 | 5.76 | 1.46 | 32.7 |
| 5 | 10 | 6.73 | 2.43 | 54.5 |
| 6 | 15 | 6.90 | 2.60 | 58.2 |
| 7 | 25 | 8.23 | 3.93 | 88.0 |
| 8 | 40 | 8.47 | 4.17 | 93.5 |

The above results show that the addition of styrene to the reaction mixture produces a considerably higher conversion of the α-methylstyrene than obtained, with the same amount of polymerization accelerator (THF), in the absence of styrene.

EXAMPLES 9 – 13

The procedure of Examples 1 – 8 was repeated, except that 15 ml of THF was employed in each of Examples 9 – 13, whereas the amount of styrene added to the reaction mixture was varied, as set forth in Table 3 below.

TABLE 3

| Example | Amount of styrene added ml | Yield of block copolymer g | α-methylstyrene content of the block copolymer g | α-methylstyrene conversion % |
|---|---|---|---|---|
| 9 | 0 | 4.70 | 1.30 | 29.1 |
| 10 | 0.45 | 6.35 | 2.50 | 56.0 |
| 11 | 0.90 | 6.90 | 2.60 | 58.2 |
| 12 | 2.70 | 10.38 | 4.28 | 96.0 |
| 13 | 4.50 | 12.30 | 4.40 | 98.0 |

From the above examples, it will be noted that the conversion of α-methylstyrene is increased by the use of greater amounts of styrene in the polymerization mixture. During the course of the polymerization of Examples 1 – 13, it was noted that the reaction mixture, which was at first colorless, gradually assumed a yellow color, a phenomenon characteristic of styryl anions. Thereafter, the yellow color changed to deep red, which is characteristic of the formation of α-methylstyryl anions. This leads to the conclusion that the styrene and the α-methylstyrene do not give a random block copolymer but a polymer block of styrene is first formed. In other words, the copolymers made according to Examples 1 – 13 had the general formula B-X-C, wherein B is a polymer block of conjugated diene, i.e., isoprene, X denotes a block of polymerized styrene units, and C represents a polymer block of α-methylstyrene.

EXAMPLES 14 – 17

The procedure of Examples 9 – 13 was repeated, but using 25 ml of THF polymerization accelerator, with the amount of styrene varied according to Table 4 below.

TABLE 4

| Example | Amount of styrene added ml | Yield of block copolymer g | α-methylstyrene content of the block copolymer g | α-methylstyrene conversion % |
|---------|---------------------------|----------------------------|--------------------------------------------------|------------------------------|
| 14 | 0 | 5.03 | 1.63 | 36.5 |
| 15 | 0.45 | 7.37 | 3.52 | 78.8 |
| 16 | 0.90 | 8.23 | 3.93 | 88.0 |
| 17 | 2.70 | 10.29 | 4.18 | 93.8 |

EXAMPLE 18

50 ml of pentamethylheptane solvent, and 10 g of styrene were successively introduced under nitrogen into a glass reaction vessel equipped with a stirrer, a thermometer and a cooling jacket, and then the mixture was heated to 50°C with simultaneous stirring under a nitrogen atmosphere. 0.5 mmole of secondary butyl lithium was then added to initiate the polymerization. After 1 hour, a mixture of 34 g of isoprene and 1 g of styrene were added to the polymerization mixture. The polymerization was continued at 50°C until the colorless polymerization mixture assumed a yellow color (owing to the formation of styryl anions).

The polymerization mixture was then cooled to −40°C and a mixture of 10 g of α-methylstyrene and 20 g of THF polymerization accelerator was added to the polymerization mixture, with the polymerization continued at −40°C for 1 hour. The polymerization was terminated by the method described for comparative Examples A - H.

A block copolymer containing 15 % by weight of α-methylstyrene units was isolated from the polymerization mixture. This block copolymer had a tensile strength of 295 kg/cm$^2$, a rigidity (S 300 %) of 39 kg/cm$^2$, a permanent set of 16 % and a melt index of 1.3 g per 10 minutes at 190°C.

COMPARATIVE EXAMPLE I

Example 18 was repeated, but the 1 g of styrene was omitted. In other words, after 1 hour of polymerization, only 34 g of isoprene was added to the polymerization mixture.

The resulting block copolymer contained less than 2% by weight of α-methylstyrene units, and had a tensile strength of 175 kg/cm$^2$, a rigidity (S 300%) of 33 kg/cm$^2$, a permanent set of 24 and a melt index of 78.

EXAMPLE 19

This example relates to the use of a bifunctional anionic initiator. The initiator was 1,4-dilithio-1,1,4,4-tetraphenyl butane, prepared as described in Macromolecules Vol. 2, No. 5, 1969, pp 453 ff. The procedure of Examples 1 - 8 was repeated, except that the above described bifunctional anion initiator was used in lieu of the secondary butyl lithium. 50 ml of THF and 0.90 g of styrene were used in this example. The elastomeric block copolymer produced had the general formula A-X-B-X-C, wherein A and C were polymer blocks of α-methylstyrene, X was polymerized styrene monomer units and B was an elastomeric polymer block of isoprene units. The block copolymer contained 10% by weight of α-methylstyrene units.

Example 19 was repeated, except the styrene was omitted. The resulting block copolymer contained only

COMPARATIVE EXAMPLE I 1.5 weight percent of α-methylstyrene units.

EXAMPLE 20

100 ml of cyclohexane solvent, 2 ml of styrene and 25 ml of α-methylstyrene were successively introduced under a nitrogen atmosphere into a glass reaction vessel provided with a stirrer, a thermometer and a cooling jacket. The contents of the reaction vessel were titrated with secondary butyl lithium at 55°C, and under a nitrogen atmosphere until the reactor contents just turned orange. Then, 25 ml of isoprene and 0.7 mg equivalents of a polyfunctional anionic initiator described below with an average functionality of 3.8, dissolved in 25 ml of cyclohexane, were added to the reaction vessel contents. The polymerization was continued at 55°C for a period of 1 hour, whereupon the temperature was lowered to 20°C and 100 ml of tetrahydrofuran (THF) was added. Then the temperature of the reaction vessel contents was lowered to −25°C, and the polymerization was continued at that temperature for 90 minutes.

The polyfunctional anionic initiator used in this example is the subject of Dutch patent application No. 7109143, entitled: process for the preparation of thermoplastic elastomeric block copolymers, filed July 2, 1971 in the names of Roest and Schepers was prepared by reacting 3.48 mmole of secondary butyl lithium at a temperature of 75°C under nitrogen at 1 atmosphere with, in order, 1.8 g of styrene, 2.57 mmole of divinyl benzene and 4.5 g of additional styrene.

26.7 g of a block copolymer, having the general formula (polyisoprene-polystyrene-poly-(α-methylstyrene))$_n$, was obtained, and the block copolymer had the following properties:

| | |
|---|---|
| melt index (190°, 2.16 kgs) | 0.1 g/10 min. |
| tensile strength | 245 kg/cm$^2$ |
| rigidity at 300 % elongation | 66 kg/cm$^2$ |
| elongation at break | 720 % |
| permanent elongation | 16 % |

What is claimed is:

1. In a process for the preparation of copolymers comprising polymer blocks of the formulae A-B-C and (B-C)$_n$, wherein B is an elastomeric diene polymer block of butadiene or isoprene, C is a polymer block of alpha-methylstyrene, and A is C or a non-elastomeric polymer block of styrene, and n is defined hereinafter, said process comprising forming a living polymer carrying at least one negatively charged diene unit in the end position by polymerization of said diene at a temperature of about 20° to about 100° C in the presence of an organo lithium compound initiator having a functionality of n, and thereafter polymerizing alpha-methylstyrene on said living polymer at a temperature below about 15°C to form an alpha-methylstyrene polymer block, the improvement comprising polymerizing on said living polymer from 1 to 100 monomer units of styrene per diene anion in the end position, at a temperature of about 20° to about 100°C, prior to the polymerization of said alpha-methylstyrene, whereby the cross-over reaction from the polymer block with said dienyl anion in the end position to the alpha-methylstyrene is facilitated.

2. Process according to claim 1, wherein from 2 to 50 monomer units of styrene are polymerized, per dienyl anion in the end position.

3. Process according to claim 2 wherein from 4 to 25 monomer units of styrene are polymerized per dieny anion in the end position.

4. Process according to claim 1 wherein the monomers are simultaneously introduced into the polymerization chamber.

5. Process according to claim 1, wherein said organolithium anionic initiator is an alkane or alkene of 1 to 20 carbon atoms wherein at least 1 hydrogen atom has been substituted by a lithium atom, or an aromatic compound wherein 2 or more hydrogen atoms have been substituted by lithium atoms.

6. Process according to claim 5, wherein said organolithium compound is an alkane or alkene wherein a single hydrogen atom has been substituted by a lithium atom.

7. Process according to claim 6 wherein said organolithium compound is secondary butyl lithium.

8. Process according to claim 1 wherein said conjugated diene is 1,3-butadiene.

9. Process according to claim 1 wherein said elastomeric polymer block B has a number average molecular weight between 10,000 and 250,000.

10. Process according to claim 9 wherein the number average molecular weight of elastomeric polymer block B is 15,000 to 150,000.

11. Process according to claim 1 wherein the polymer block of α-methylstyrene has a number average molecular weight between 200 and 100,000.

12. Process according to claim 1 wherein the polymer block of α-methylstyrene has a number average molecular weight between 500 and 50,000.

13. Block polymers of the formulae A-B-X-C, (B-X-C)$_n$, or C-X-B-X-C wherein A is a nonelastomeric polymer block of styrene or alpha-methylstyrene having a number average molecular weight of 200 to 100,000 and a glass transition point above 25°C;

B is an elastomeric polymer block having a number average molecular weight of between 10,000 and 250,000 of butadiene or isoprene;

C is a polymer block of alpha-methylstyrene having a number average molecular weight of 200 to 100,000, X represents from 2 to about 50 polymerized monomer units of styrene, and $n$ is a number of 1 to 8, produced by an improvement in the process of forming a living polymer carrying at least one negatively charged diene unit, said diene being isoprene or butadiene, in the end position by polymerization of said diene at a temperature of about 20° to about 100°C in the presence of an organo lithium compound initiator having a functionality of $n$, and thereafter polymerizing alpha-methylstyrene on said living polymer at a temperature below about 15°C to form an alpha-methylstyrene polymer block, the improvement comprising polymerizing on said living polymer from 1 to 100 monomer units of styrene per diene anion in the end position, at a temperature of about 20° to about 100°C, prior to the polymerization of said alpha-methylstyrene, whereby the cross-over reaction from the polymer block with said dienyl anion in the end position to the alpha-methylstyrene is facilitated.

* * * * *